United States Patent Office 3,057,217
Patented Oct. 9, 1962

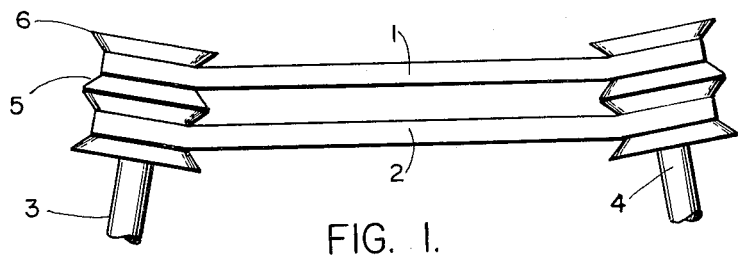
FIG. 1.
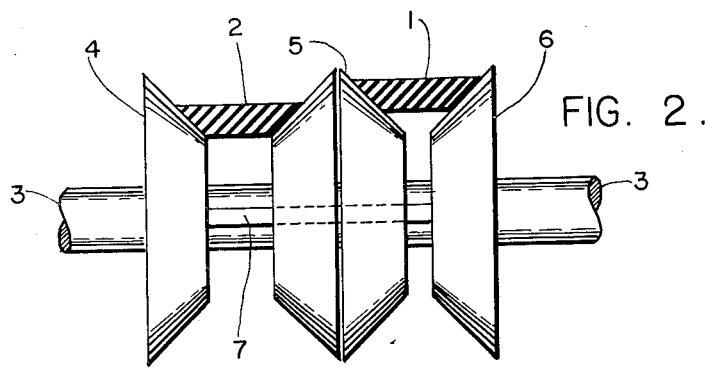
FIG. 2.
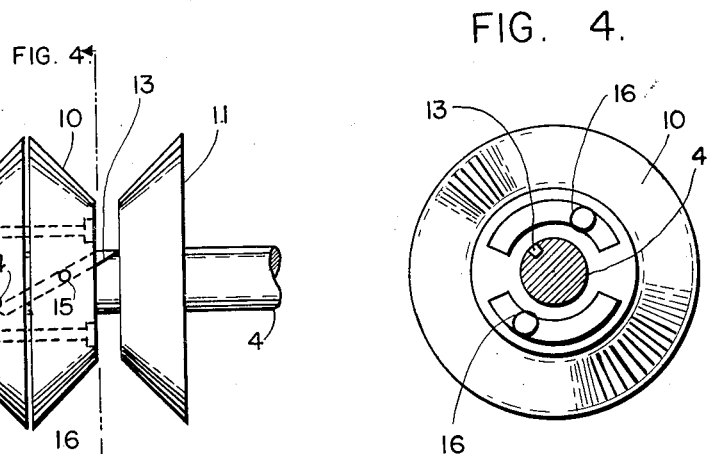
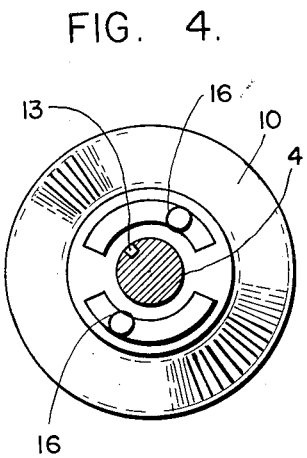
FIG. 3.
FIG. 4.

3,057,217
V-BELT EQUALIZER
George R. Stibitz, Underhill, Vt.
Filed July 17, 1959, Ser. No. 827,919
1 Claim. (Cl. 74—230.17)

The present invention relates to power transmission by V belts, and more particularly to means for automatically equalizing the relative tensions and loads among a multiplicity of such belts transmitting power from a single driving shaft to a single driven shaft.

V belts are widely used either singly or in multiple sets for the transmission of mechanical power. When multiple belts are used, any slight misalignment between the driven and driving shafts causes one belt in the group to be strained to a greater extent than the others and hence to apply a greater force to the surfaces of the pulley than do the others. The subnormal force on the lightly loaded belts allows them to slip and place still greater stresses on the tighter belt, with consequent rapid destruction of the latter.

An object of my invention is to provide means for equalizing the tension in the various belts of a multiplicity of cooperating belts, by automatic adjustments of the effective pulley diameter. A further object of my invention is to provide means for automatically maintaining equal ratios of driving and driven pulley diameters for the various belts of such multiplicity.

FIGURE 1 of the accompanying drawings shows the effect on belt strain when the driving and driven shafts are misaligned.

FIGURE 2 shows the means used for equalizing the belt lengths in case of misalignment.

FIGURE 3 represents the means used to equalize the pulley ratios.

FIGURE 4 is an end view of one of the flanges of FIGURE 3.

In FIGURE 1, two belts are shown transmitting power from pulleys on a driving shaft, 3, to a driven shaft 4. A misalignment consisting of non-parallelism between the shafts is shown in exaggerated form, where it will be clear that belt 2 is strained to a greater length than is belt 1. If the belts are of equal lengths before straining, then in use belt 2 will apply a greater force to the pulleys than does belt 1. Belt 1 will slip more than belt 2, and throw still greater load on belt 2. A similar unbalance will occur if belt 1 is initially somewhat longer than belt 2.

It is clear that the unbalance can be corrected by adjustment of the spacing between the flanges of the respective pulleys, making the grooves engaged by belt 2 wider, and those engaged by belt 1 narrower. With this adjustment, belt 1 will ride at a greater radius on its pulleys than will belt 2, thus compensating for the angular error between the shafts, or for slight differences in belt length, or both.

If, for example, the ratios of driven to driving diameters is 1:1, the constrained length, L, of a belt riding at a radius $r$ in each pulley will be $$L = 2\pi r + 2D$$

where D is the distance between centers of the pulleys. It is evident that a variation in D may be compensated by a proportional variation in $r$, of opposite sign and in the proportion $1:\pi$. If identical adjustments are made in the driven and driving pulleys, the ratio of diameters will remain 1:1.

FIGURE 2 illustrates the device which provides automatic adjustment of tension in the two belts 1 and 2. V groove flanges 4 and 6 are rigidly attached to shaft 3. Double flange 5 is slidably mounted on this shaft, but engages a keyway 7, in shaft 3, which prevents relative rotation between flange 5 and shaft 3.

Belt 2 (shown in section of FIGURE 2) rides between flanges 4 and 5, and belt 1 is similarly related to flanges 5 and 6. Flange 5 is acted upon by resultant forces exerted by belts 1 and 2. If at any instant the tension in belt 2 exceeds that in belt 1, the net force on flange 5 acts to move it away from 2, permitting belt 2 to ride at a smaller radius, and simultaneously forcing belt 1 to a greater radius. This action compensates for an incorrect relation between the belt and the pulley center-distance.

However, it will be clear that, when the driving and driven pulleys are unequal two further conditions must be satisfied, namely that the angular rates about the driving shaft at the points of contact between the belts and the driving pulleys must be equal, and that the angular rates about the driven shaft at the points of contact between the belts and the driven pulleys must likewise be equal.

FIGURE 3 illustrates the means provided in my invention for ensuring equal pulley ratios.

Flanges 8 and 11 are rigidly mounted on shaft 4. Flanges 9 and 10 are slidable and rotatable on shaft 4, but are constrained to move with pins 14 and 15 in engagement with helical slots 12 and 13 in shaft 4. They are further restrained by links 16, which maintain a constant axial distance between these flanges while leaving them free to rotate independently of each other within limited angular ranges.

One belt, not shown, rides between flanges 8 and 9, and another between 10 and 11. If one of these, say that between 10 and 11, is driven at a higher rate than the other, moving away from the reader at the tops of the groove in FIGURE 3, then, because of slippage between this belt and flange 11, flange 10 is rotated in advance of the shaft, top going, while the other belt retards flange 9. In each case, the relative rotation is such that the actions of pins 14 and 15 urge the respective flanges 9 and 10 closer to flange 11, and further from flange 8. The axial motions of 9 and 10 thus provide a larger radius, $r$, for that belt which over-rides the pulley, maintaining equal angular rates of the two belts.

Cooperation between a pulley of the type shown in FIGURE 2 on one shaft, and a pulley of the type shown in FIGURE 3 therefore maintains both equal tensions in the two belts and equal angular rates, and results in effectively equal loads on the two belts.

I claim:

A compound pulley constructed to engage a multiplicity of V-belts, said compound pulley comprising a shaft, a multiplicity of flange elements mounted on said shaft to form a multiplicity of V-grooves, certain of said flange elements being rotatable about and slidable along said shaft, certain other of said flange elements being restrained against axial motion along said shaft and means responsive to differential rotational motion of at least two of said flange elements to cause said two flange elements to move axially along said shaft.

References Cited in the file of this patent
UNITED STATES PATENTS

| | | |
|---|---|---|
| 2,623,410 | Billey | Dec. 30, 1952 |
| 2,649,811 | Noe | Aug. 25, 1953 |
| 2,689,484 | Phares | Sept. 21, 1954 |
| 2,741,135 | Numan | Apr. 10, 1956 |
| 2,805,583 | Besel | Sept. 10, 1957 |

FOREIGN PATENTS

| | | |
|---|---|---|
| 1,106,748 | France | July 27, 1955 |
| 807,160 | Great Britain | Jan. 7, 1959 |